(12) United States Patent
Hanson (10) Patent No.: US 7,024,949 B2
(45) Date of Patent: Apr. 11, 2006

(54) LOAD TRANSDUCERS EMPLOYING A SENSING DEVICE

(76) Inventor: Richard A. Hanson, 12921-182nd Ave. NE, Redmond, WA (US) 98052

( * ) Notice: Subject to any disclaimer, the term of this patent is extended or adjusted under 35 U.S.C. 154(b) by 614 days.

(21) Appl. No.: 09/844,437

(22) Filed: Apr. 27, 2001

(65) Prior Publication Data

US 2002/0157477 A1    Oct. 31, 2002

(51) Int. Cl.
   *G01L 1/04*    (2006.01)

(52) U.S. Cl. .................................. 73/862.632

(58) Field of Classification Search .................. 73/788, 73/796, 818, 826, 862.636, 862.637, 862.638, 73/862.639, 862.632
See application file for complete search history.

(56) References Cited

U.S. PATENT DOCUMENTS

| | | | | |
|---|---|---|---|---|
| 4,550,617 A | * | 11/1985 | Fraignier et al. | 73/862.042 |
| 4,561,512 A | * | 12/1985 | Tramposch | 177/229 |
| 4,589,810 A | * | 5/1986 | Heindl et al. | 414/4 |
| 4,699,006 A | * | 10/1987 | Boxenhorn | 73/514.15 |
| 4,738,146 A | * | 4/1988 | Baumgartner et al. | 338/114 |
| 5,313,023 A | * | 5/1994 | Johnson | 177/229 |
| 5,952,647 A | * | 9/1999 | Sarrazin et al. | 250/227.14 |
| 5,959,209 A | * | 9/1999 | Takeuchi et al. | 73/514.34 |
| 6,327,913 B1 | * | 12/2001 | Lustenberger et al. | 73/778 |

* cited by examiner

*Primary Examiner*—Max Noori
(74) *Attorney, Agent, or Firm*—Richard D. Multer (57) ABSTRACT

Force sensing transducers which employ inline sensing and an integral crossarm support for a sensing component. These transducers have a metal frame with at least one ring; a beamlike crossarm which lies within, spans, and is integral with a ring of the transducer frame; and at least one strain sensor mounted, preferably under preload, in an aperture in the innermost (or single) ring.

20 Claims, 7 Drawing Sheets

LOAD TRANSDUCERS EMPLOYING A SENSING DEVICE

TECHNICAL FIELD OF THE INVENTION

In one aspect, the present invention relates to novel, improved force sensors with transducers which are preferably of the vibrating-crystal type.

In a second aspect, the present invention relates to force sensors which do not have the accuracy limitations of prior art sensors with metallic load-carrying components or the load limitations of those prior art force sensors in which the load is carried by a crystal-type transducer.

BACKGROUND OF THE INVENTION

Force sensing structures which use electrical sensors to produce a signal indicative of a load applied to the structure are commonly referred to as load cells. Historically, load cells have had accuracy limitations associated with using a metal member to carry the primary load and with the attachment of a strain sensor to the metal member to measure the load. Stress induced strain instabilities in the metal have produced signal errors. The attachment of the strain sensor with adhesives and simple beamlike spring structures also produce signal errors and make it difficult to obtain a stable and repeatable signal proportional to the load applied to the load cell.

The primary load carrying element (PLC) is generally made of a metal which becomes less perfectly elastic and more dimensional unstable as the stress in the metal is increased and which has a temperature expansion characteristic different from that of the load cell strain sensor. Each of these effects generally causes signal error. Additionally, the interface between the strain sensor and the metal is not perfectly stress free or stable. This also produces signal errors.

There are other designs which use vibrating elements (generally crystals) to directly carry the majority of the load which is to be measured. The crystals act directly as force sensors (and not as strain sensors sensing deflection of a PLC). This minimizes the above-stated errors which would be present if a metal load carrying member were used. Vibrating crystal force sensor designs are, however, directly and seriously limited by the load limits of the crystals (which are brittle and best operated at a small fraction of the material stress test limit). For these reasons, such devices have a very limited ability to withstand loads beyond that load which will produce a fall signal (i.e., over-range loads) unless the crystal is configured to give only a small signal. That can be done only at the expense of a serious loss of accuracy. Such devices also have a comparatively highly stressed joint between the metal and the crystals, and this can produce errors or give reliability problems. Still other designs use either an analog strain gage or a vibrating element strain gage (generally a crystal) glued to the metal to transfer the strain from the metal to the strain gage. The glue joint can produce both temperature and time dependent signal errors.

U.S. Pat. No. 5,313,023 discloses a load cell which uses two sets of cantilevered parallelogram spring structures fabricated in a monolithic structure for mounting a pair of vibrating crystal strain gages of a form referred to as a double ended tuning fork (see U.S. Pat. No. 4,215,570).

The crystals are mounted on surfaces which are at a right angle to the direction of motion of the springs and parallel to the strain sensor sensing axis. This requires parallelogram like structures to keep the mounting surfaces parallel to the direction of motion. This arrangement is typical and is still very dependent on a bonded interface joint to carry the signal strain to the strain sensors. The crystal attachment in this type of device experiences a shear load, and any creep in that joint will produce some signal error.

The load cell disclosed in U.S. Pat. No. 5,313,023 also uses a cantilever beam structure which results in large moment stresses being present in the mounting of the load cell. This can produce signal error and potential mounting problems for the user.

Also previously proposed have been load cells of the ring type. The approach in these prior art cells is to place the sensing element directly across the ring both in the case of single ring and double ring designs. This approach limits the strain signal sensor to measurement of strains in the rings only and limits the options of the designer in optimizing all the essential characteristics of the load cell such as stiffness, stress, and signal characteristics.

There are other prior art transducer designs which use simple beam structures to preload a strain sensing crystal, adjust the transducer capacity, and avoid the use of glue joints to directly carry the signal component of strain to the strain sensors. Such beam structures are generally not integral to the primary load carrying structure but instead preload crystals between separate spring members which strain in response to the applied load. The use of separate pieces for preloading can cause instabilities and signal errors.

There is consequently an existent, continuing need for load sensors which do not have the above-discussed disadvantages of those heretofore proposed designs which employ metal load carrying elements, vibrating crystal load sensing components, and other prior art approaches to load measurement.

SUMMARY OF THE INVENTION

Such load sensors have now been invented and are disclosed herein.

These novel transducer devices employ in-line sensing and an orthogonal crossarm support for a sensing component. Dual crystal embodiments of the invention are preferred because designs employing only a single sensor do not have the advantage of eliminating errors—such as those attributable to changes in temperature—which do not appear in a signal that is the difference between the signals from the two crystals in a dual crystal design. The principles of the new invention are, however, largely adaptable to single crystal devices. Those designs might advantageously be used where the smallest size and lowest cost are more important than the highest possible accuracy.

The novel transducers disclosed herein have at least one metal ring, a beamlike crossarm which lies within, spans, and is integral with the ring, and at least one strain sensor mounted in an aperture in the innermost (or single) ring.

From another prospective, the present invention uses a monolithic structure with a different approach to mounting and loading the strain sensors (preferably vibrating crystals and preferably but not limited to framed crystals as disclosed in U.S. Pat. No. 4,856,350). The strain sensors are preloaded along their sensing axes against spring surfaces at a right angle to the strain sensor sensing axis. The strain sensors have very small compression area contact which carries all the signal load. That eliminates any dependence on a bonded joint to carry the signal strain and eliminates corresponding, potentially associated signal errors. Also, this approach avoids parallelogram springs by eliminating shear loaded surfaces which deflect in response to a load and which must remain parallel as they deflect.

The sensor(s) sense strain perpendicular to the length of the crossarm member. In preferred embodiments of the invention, the crossarm component is an angled member with hingelike sections which, in combination with wider, rigid sections, cause the crossarm member to function as a mechanical linkage. This novel transducer construction: (1) minimizes the problems associated with an inevitably imperfect metal load sensing member, (2) minimizes the errors associated with interfacing strain sensors to metal load carrying members, (3) makes it possible to tailor and more nearly optimize the design to the application, and (4) provides a transducer with a large over-range in a reliable and practical manner.

Transducers embodying the principles of the present invention differ significantly from prior art transducers in that they employ a monolithic structure and vibrating crystal strain sensors preferably but not limited to framed crystals in new combinations of ring and beamlike members. The beamlike members preload the strain sensors along their sensing axes against surfaces at a right angle to the strain sensor sensing axis with the crystal strain sensors having very small compression area contact which carries all the signal load. This eliminates any dependence on a bonded joint to carry the signal strain. This approach also eliminates the potential signal errors which can arise from crystal plane bending of the strain sensors and does not require parallel cantilever springs (U.S. Pat. No. 4,067,241 and U.S. Pat. No. 4,020,448) or parallelogram springs (U.S. Pat. No. 5,313,023). Elimination of these transducer components is achieved by employing beams which are not cantilevered. Also, the prior art transducers disclosed in Pat. Nos. 4,020,448 and 4,067,241 use platelike crystals loaded on edge via a complex multipiece pressure sensing assembly directly from fluid pressure. The transducers disclosed herein instead use strain transfer through a (typically) multiring structure to edge load a much more delicate and compliant form of crystal.

The transducers disclosed herein receive mechanical loads directly and substantially on the transducer centerline and avoid the problems associated with mounting cantilever designs to the structure where the load is to be sensed (U.S. Pat. No. 5,313,023 and U.S. Pat. No. 4,751,849). That prior art arrangement subjects the load cell attachment to substantial unanticipated errors for the user if the mounting is not carefully designed and fabricated and if the load cell is not carefully mounted.

Transducers embodying the principles of the present invention add a crossbeam strain sensor support element to a ringlike structure to which the strain sensor is mounted as contrasted to prior art transducers where the cross member is the strain sensor, sensing strain along its length (Russian patent documents SU-666-446, SU-574-637, and SU-974-151-A). Using the crossbeam as support geometry for a strain sensor rather than as a strain sensor gives the transducer additional features and options which allow better optimization of all the load cell characteristics.

Transducers embodying the principles of the present invention generally use an angled form of crossbeam and nonconcentric inner rings. This provides the best isolation of the signal sensors from extraneous external mechanical and thermal influences and allows the designer more options in tailoring the load cell for best performance in a particular application.

Other important features, advantages, and objects of the invention will be apparent to the reader from the foregoing and the appended claims and as the ensuing detailed description and discussion of the invention proceeds in conjunction with the accompanying drawings.

BRIEF DESCRIPTION OF THE DRAWINGS

The advantages, features, and objects of the invention will be apparent to the reader from the foregoing and the appended claims and as the ensuing detailed description and discussion of the invention proceeds in conjunction with the accompanying drawings.

DETAILED DESCRIPTION OF THE INVENTION

Figure 1:
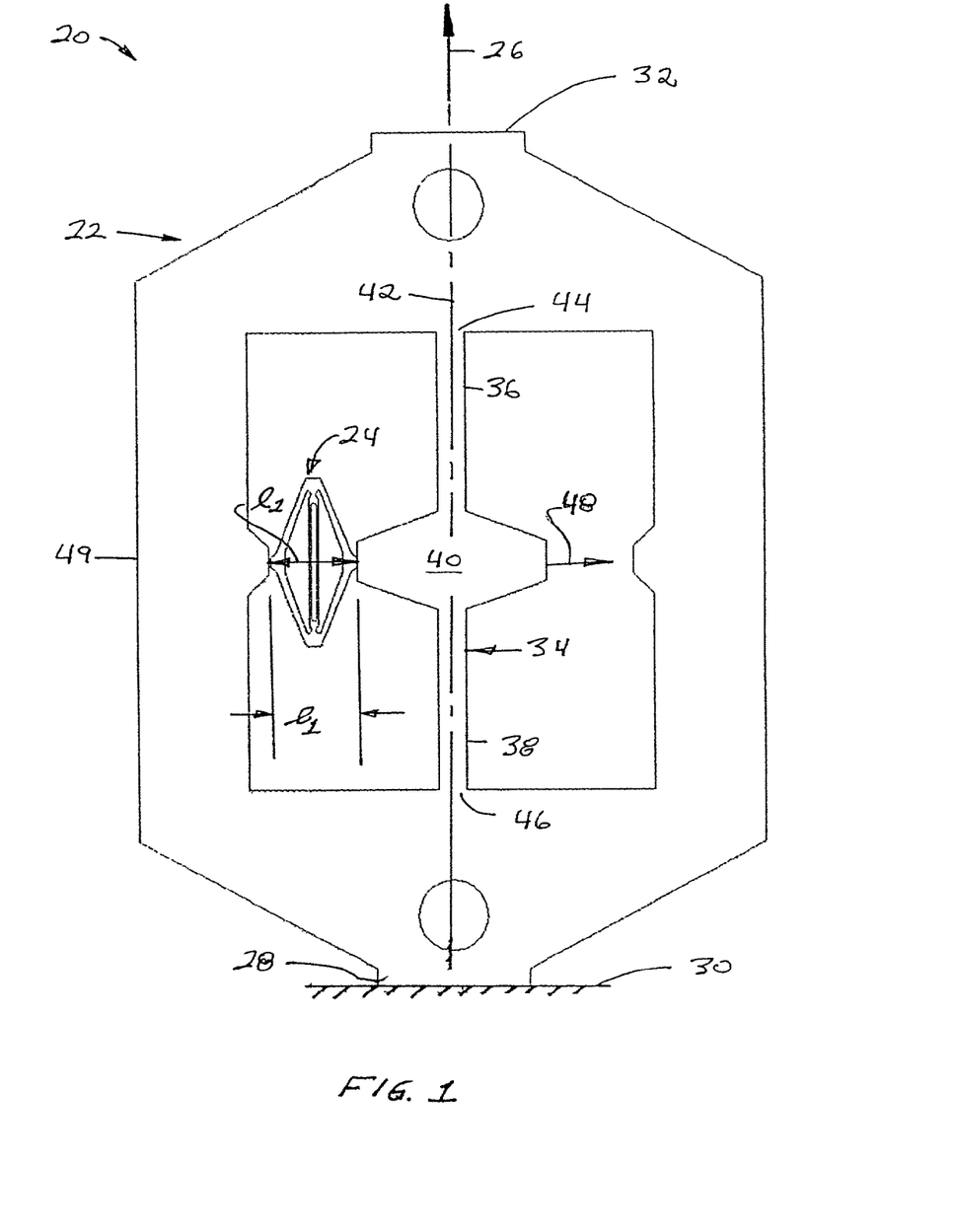
FIG. 1 is a plan view of a single crystal, in-line force transducer embodying the principles of the present invention and having a metal frame comprised of a ring and an integral crossbeam.

Referring now to the drawing, FIG. 1 depicts a load measuring transducer 20 constructed in accord with, and embodying, the principles of the present invention. Transducer 20 has a metal frame 22 and a load sensing crystal 24. The transducer is designed to measure loads applied to the transducer in the direction indicated by arrow 26.

The metal frame 22 of transducer 20 is a platelike ring fabricated as by via wire electron discharge machining from a strong and elastic metal such as 15-5 stainless steel or 7075 aluminum. This transducer component has a mounting pad 28 which engages a supporting structure representatively identified in FIG. 1 by reference character 30. At the opposite end of transducer frame 22 is a second pad 32 to which the load being measured is applied.

Spanning ring 22 is an integral crossbeam 34. The two arms 36 and 38 of the beam are joined at their inner ends to a hub 40 which extends along, and is symmetric relative to, the longitudinal axis 42 of the transducer. At their outer ends, beam arms 36 and 38 meet and are joined to ring top and bottom wall elements 42 and 44 at locations 44 and 46.

In this simplest, most basic embodiment of the present invention, the crossbeam 34 is a straight member aligned with the load. The sensing crystal 24 is mounted between the crossbeam hub 40 and the side wall 49 of ring 22 and preloaded by the ring and the crossbeam.

With regard to prestraining sensor mounting and loading, there are two techniques generally used to transfer the strain load to the strain sensing element in a transducer. The first is the use of an adhesive, and the second is to provide some springlike mechanical arrangement to clamp the strain sensing element between two surfaces. In transducers as disclosed herein, it is preferred that the crystal be preloaded in place by making the distance between the two surfaces of the metal parts on opposite sides of the crystal in (~, in FIG. 1) less than the corresponding dimension t2 of the sensing element along its sensing axis. At least one element against which the sensing element is preloaded must be springlike in the direction of the sensing element sensing axis. That element in transducer 20 is crossbeam 34.

In installing the sensing device, the springlike element is moved manually or with some type of fixture away from a complementary element engageable by the sensing device as suggested by arrow 48 in FIG. 1 to make the opening wider than the sensing element length in that direction of the sensing element. The sensing element is then placed in the opening, and the springlike element is slowly released to clamp the sensing element between the two complementary sensing device supporting elements under a load determined by the stiffness of the springlike element, the stiffness of the sensing element, and the interference dimension; i.e., the difference between the length of the sensing device (greater) and the corresponding dimension of the opening in which that device is installed (smaller).

With the crossbeam 34 and the load aligned as shown in FIG. 1, the ring 22 is compressed when a load is applied to it. The sides of ring 22 thereupon bow outwardly and the load sensor goes into tension (or reduced compression if the sensor is preloaded). A signal reflecting the change in the sensor strain is generated.

Figure 2:
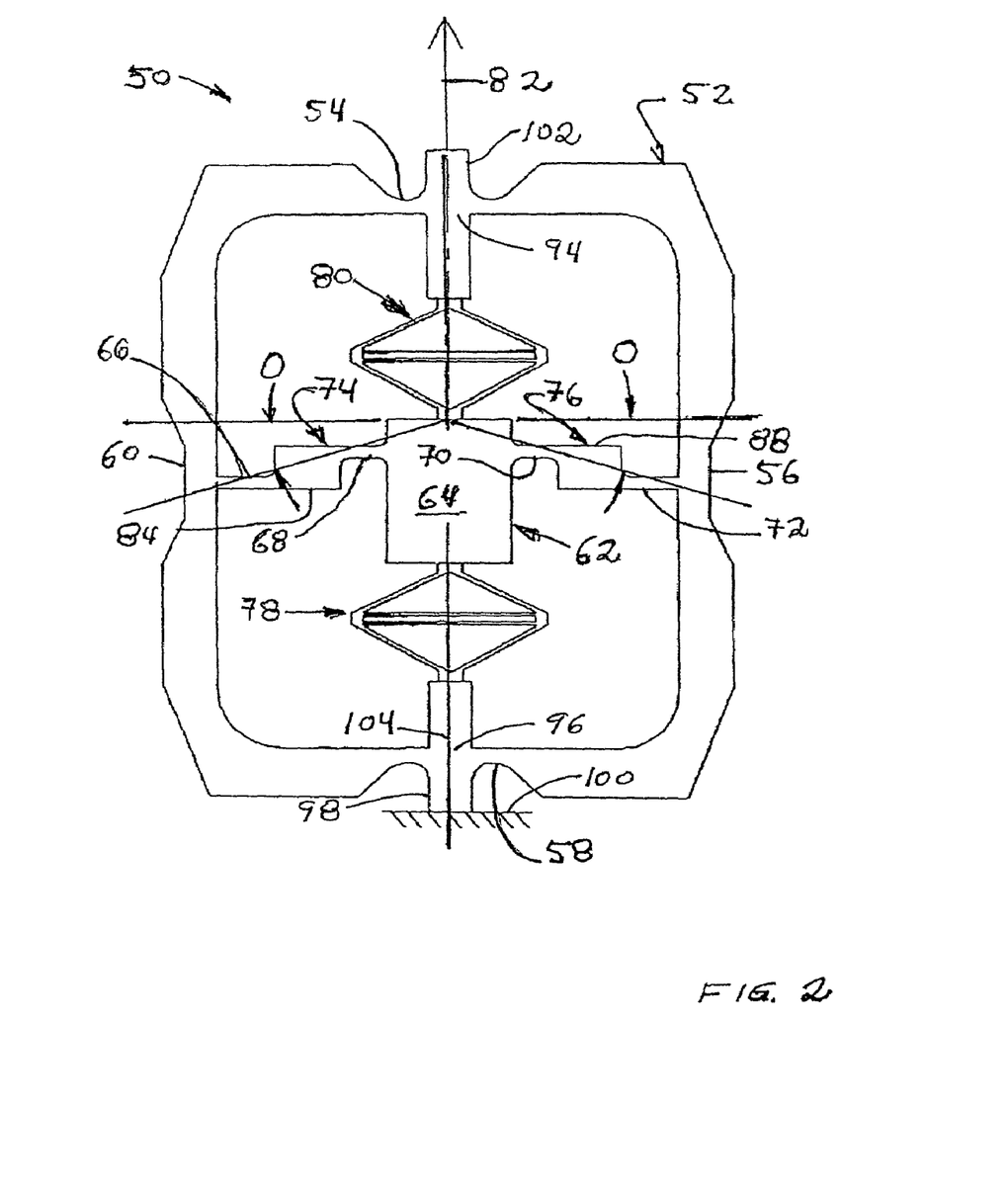
FIG. 2 is a plan view of a second, single crystal transducer which also embodies the principles of the invention; this transducer differs from the FIG. 1 transducer primarily in that it has a metal frame with an angled crossbeam.

FIG. 2 depicts a transducer 50 also constructed in accord with and embodying the principles of the present invention. This transducer differs from the transducer 20 described above primarily in that: (1) the frame 52 of the transducer has hingelike segments 54, 56, 58, and 60 which optimize transducer performance; (2) the straight crossbeam 34 of transducer 20 is replaced with a crossbeam 62 which, in addition to hub 64, has a four hinge configuration (the hinges are identified by reference characters 66, 68, 70, and 72) and two angled crossarms 74 and 76; (3) the transducer has two active force sensing crystals 78 and 80; and (4) the load (indicated by arrow 82) is applied at right angles to the long dimension of crossbeam 62 rather than in the same direction as it is in the FIG. 1 transducer.

As mentioned in the preceding paragraph, transducer 50 has a crossbeam 74 with four hingelike sections 66, 68, 70, and 72. More specifically, angled crossbeam arm 74 has two hingelike sections 66 and 68, and arm 76 has the same number of hingelike sections 70 and 72.

Any elongated structural component such as crossbeam arms 74 and 76 with two narrowed hingelike sections and relative rigid sections in between such as segment 84 of crossbeam arm 74 and segment 88 of crossbeam arm 76 acts generally like a rigid bar with rotational pinned joints at its ends. The preferred configuration of an angled crossbeam has two such structures, one on each side of crossbeam hub 64 as shown in FIG. 2. The crossbeam 62 consequently acts like a structure with a rigid center section supported by two rigid bars, each with rotational pinned joints at its ends (generally, for any hinge to be effective, it has to be opposite a second hinge on the other end of the hinged element). The goal is for the angled crossbeam to have the maximum signal strain occurring at a right angle to the strain imposed on the ends of the crossbeam and minimum stress in the crossbeam. That will be the case when the crossbeam has two rigid bar sections each with two hinges as just discussed and shown in FIG. 2.

Why a crossbeam with angled arms is employed is discussed more fully hereinafter as is the operation of a transducer with two active crystals such as those identified by reference characters 78 and 80 in FIG. 2.

Except as discussed above, transducer 50 is similar to transducer 20. It has an integral pad 98 for supporting the transducer from structure 100. At the opposite of frame 52 is an integral load pad 102 to which the load identified by arrow 82 is applied along the vertical axis of symmetry 104 of the transducer.

As shown in FIG. 2 by arrow 82, a tensile load applied to transducer frame or ring 52 causes the two points 94 and 96 where the angled crossbeam 62 is attached to the ring to move towards each other, placing the crossbeam in compression. If the crossbeam is not straight, i.e., has angled arms 74 and 76, the crossbeam will become more bowed as it experiences compression along its length and will, therefore, have a strain component at a right angle to the strain on its ends. The crystals 78 and 80 have sensing axes substantially parallel to the direction of the force applied to the ring. The crystal 78 mounted between ring 52 and the concave side of angled crossbeam 62 experiences along its sensing axis a combined strain attributable to the crossbeam motion plus the strain of the ring at the point of the crystal attachment since those two motions are in opposite directions. The crystal 80 on the convex side of the ring 52, on the other hand, sees a much smaller signal strain since the motions of the angled arm and the ring attachment point are in the same direction. In situations where maximum signal strain in the sensor is desired, a single crystal on the concave side may be used, whereas in situations where a large ring strain is needed (for lower load caging for example) a crystal placed on the convex side is useful.

Figure 3:
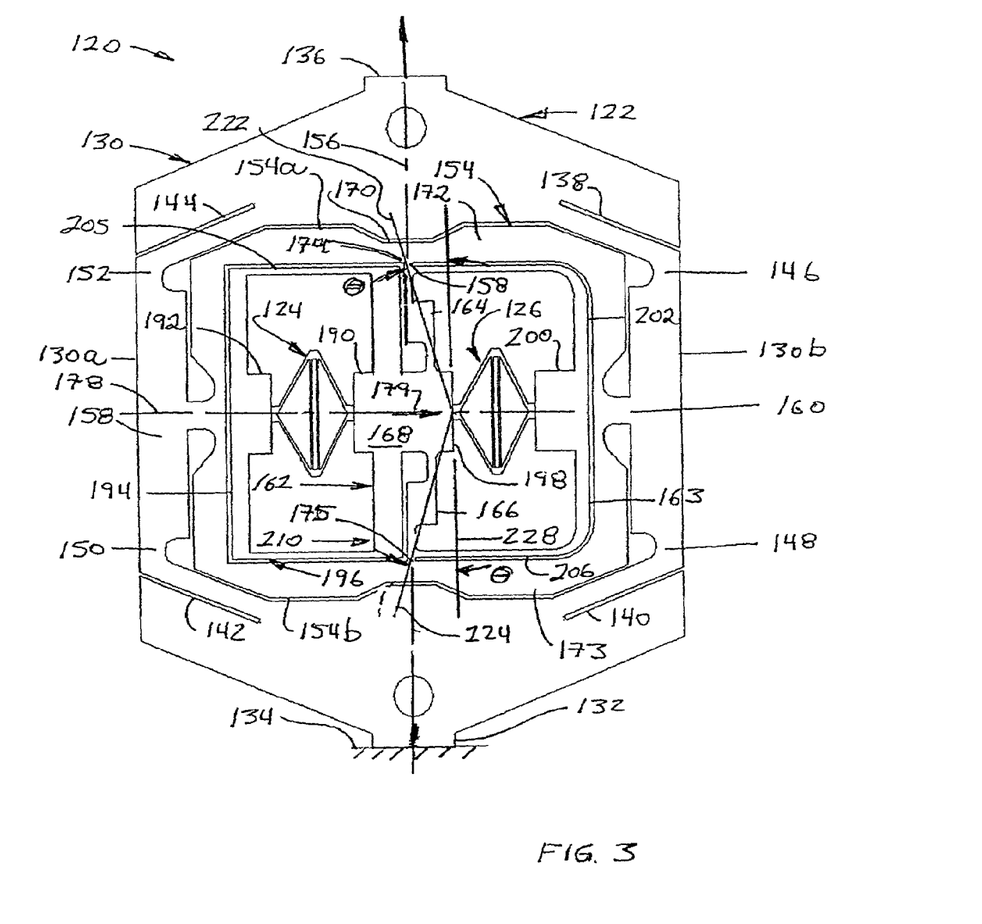
FIG. 3 is a plan view of a dual crystal in-line force transducer which embodies the principles of the present invention and has an angled crossbeam member and a fixed reference crystal together with an active load sensing crystal.

FIG. 3 depicts a third transducer 120 embodying the principles of the present invention. Transducer 120 has a metal frame 122 and two crystal type sensors 124 and 126.

The metal frame 122 of transducer 120 is a platelike member fabricated from an appropriate metal such as one of those identified above. This transducer component has an outer ring 130 with a mounting pad 132 which engages a supporting structure representatively identified by reference character 134. At the opposite end of transducer frame 122 is a second pad 136 to which the load being measured is applied. Slits 138 . . . 144 in the outer ring in combination with narrowed, hingelike ring segments 146 . . . 152 provide over-range stops and give the transducer in which frame 22 is incorporated a high over-range capacity. This is an important feature which keeps force sensing crystals 124 and 126 from being overstressed and is a feature typically not possessed by transducers of the vibrating crystal type.

Referring still to FIG. 3, a second, integral, intermediate ring 154 is surrounded by outer ring 130 with the two rings being joined at opposite sides of transducer frame 122 over areas extending equally to both sides of central vertical axis 156 as shown by reference characters 158 and 160.

Spanning inner ring 154 is an integral crossbeam 162 which also functions as a preload arm for crystals 124 and 126. The preload arm has a folded back configuration providing a third, inner ring 163 to which crystal 126 is mounted under preload. This configuration allows an increased compliance for a given space and a given width of the cross sections. This results in a smaller overall size of the load cell. Equally or more important, this geometry enables a small area attachment of the preload arm to the rest of the transducer frame to be employed.

That essentially eliminates the possibility of unwanted stress stiffening as the load cell is loaded (guitar string effect). If stress stiffening did occur, it would be a source of nonlinearity of the signal as both a function of force and temperature.

The two angled arms 164 and 166 of crossbeam 162 are joined at their inner ends to a hub 168 which extends along, and is centered on, axis 156. At their outer ends, beam arms 164 and 166 meet and are joined to reduced section hinge segments 170 and 171 of intermediate ring top and bottom wall elements 172 and 173 at 174 and 175.

The reduced section, hinge segments 170 and 171 of intermediate ring top and bottom walls 172 and 173 give intermediate ring 154 the compliance needed to obtain signals of useful, if not optimum, magnitude from transducers 124 and 126. Designing load cells which use strain sensors poses the problem of obtaining a large strain and a correspondingly large and useful signal while keeping stresses in the desired range, even when the transducer is carrying a large load. With a simple geometry not employing hinges, the strain-produced signals are smaller when the stresses in the transducer are in the desired range; and small strain signals are more sensitive to various error mechanisms. It should be noted, however, that some types of strain sensors may not be able to work reliably or accurately with the large strain.

The arms 164 and 166 of crossbeam 162 are oriented at the same, acute angle E) with respect to an axis 178 orthogonally related to the axis of symmetry 156 of transducer frame 122. As in the simple basic embodiment of the invention shown in FIG. 1, and with the crossbeam aligned with the load, outer ring 130 of transducer 120 is compressed when a load acting in the direction of arrow 179 is applied to it. The sides 130a and 130b of the outer ring pulling the upper and lower segments 154a and 154b of intermediate ring 154 toward each other thereupon bow outwardly, the hub 168 of crossbeam 162 moves to the right as indicated by arrow 179 in FIG. 3 because the angles of the crossbeam arms 164 and 166 relative to axis 178 increase and load sensor 124 goes into tension (or reduced compression if the sensor is preloaded); and a signal reflecting the change in the sensor strain is generated.

In transducer 120, the load is transferred from outer ring 130 to inner ring 154 and from that ring to load measuring transducers 124 and 126. Both transducers 124 and 126 are active; i.e., capable of generating signals responsive to a load applied to the transducer in an arrow 156 direction. The advantage of employing two active transducers is that second order non-linearities can be cancelled by employing the difference between the two signals as a signal representative of the load applied to the transducer.

Transducer 120 is mounted with preload between a pad 190 on an integral, straight, springlike crossbeam segment 191 spaced from angled crossbeam arms 164 and 166 on crossbeam 162 and a complementary, relatively rigid, mounting pad 192 at the end of hub 168 and the relatively rigid end wall 194 of the cup-shaped inner ring 196. Transducer 126 is similarly mounted between crossbeam mounting pad 198 and a mounting pad 200 at the end wall 202 of the inner ring 163 provided by the folded back configuration of crossbeam 162. The four mounting pads 190, 192, 198, and 200 are axially aligned and centered on the horizontal axis of symmetry 178 of transducer 120. Inner rings 196 and 163 have side walls 205 and 206 concentrically surrounded by intermediate ring 154 of transducer frame 122. Those ends of inner rings 163 and 196 opposite end walls 194 and 202 are respectively integral with angled crossbeam arms 164 and 166 and with crossbeam segment 210.

The inner rings 163 and 196 integrated with the crystal preload components of crossbeam 162 are different with the ring 196 around crystal 124 being designed to move with the right end of crystal 124, thus making that crystal a fixed reference. The ring 163 surrounding crystal 126 on the other hand is attached near the outer ends of angled crossbeam 162; and crystal 126, therefore, sees the fall strain of the motion of the crossbeam along a direction oriented at 90 degrees to a line 212 between the points 214 and 216 where the crossbeam is attached to the ring. The outer ring 130 of transducer 120 carries the primary load, isolates the inner rings 163 and 196 from external thermal and loading error effects, and provides both complaint and stiff sections to make caging possible. To minimize temperature sensitivity, the two crystals 124 and 126 are mounted across sections of equal stiffness and see substantially the same temperature profile. The outer ring 130 acts as a long thermal path to make the temperature profile more nearly equal on the two crystals.

The long mechanical loading path provided by the outer ring 130 also tends to isolate the inner rings 163 and 196 from the lateral or moment load errors which exist to some extent in almost any application of the present invention. The stiff sides 218 and 220 of outer ring 130 also carry the overload on transducer 120 with minimal additional strain in the strain sensors when the hinge sections 146, 148, 150, and 152 of that ring bend sufficiently to close down gaps or slits 138, 140, 142, and 144. Once those gaps are closed, the strain sensors 124 and 126 are largely protected against overstressing.

If the crossbeam has angled arms, as is shown in FIG. 3, the strain in the angled arms in directions perpendicular to the length of those arms may be greater than the strain in ring 196 at the point where the arm is attached but will generally be somewhat smaller than the strain at the points on the ring where the ring is loaded. The strain induced in the strain sensors may be larger or smaller than the strain in the ring at the points where the crossbeam arms are attached. This phenomenon can be used to increase or decrease the signal strain in the strain sensors as desired. Generally maximum signal is desired if the strain sensors are not overstressed by overloading or environmental shock in which case the signal may need to be decreased to insure reliability.

In the transducer 120 shown in FIG. 3, the intermediate ring 154 attached to outer ring 130, taken together with angled crossbeam arm 162 (where the force component between the outer ring 130 and the intermediate ring 154 is equivalent to a direct force application on a single ring), is equivalent to an isolated single ring with an angled crossbeam oriented at 90 degrees to the direction of load application. In this relationship, and with ring 154 loaded in compression, a strain sensor placed between the ring 154 and angled crossbeam arm 162 will sense a strain which is the algebraic sum and combination of the movements of the crossbeam attach points (the point on the ring where the sensor is attached and the motion of the crossbeam resulting from its bending at the point where the sensor is attached). For a sensor such as 126 placed between the intermediate-ring and the crossbeam on the concave side of the crossbeam, the strain at the crossbeam attach points adds to the strain in the crossbeam due to bending of the crossbeam. This additive effect increases the strain signal in the strain sensor for given stresses in the ring and crossbeam and can be useful in situations where maximum signal is needed at minimum stress in the ring. Conversely, a strain sensor on the convex side with the same loading on ring 154 sees a smaller net strain of the crossbeam, and that can be useful in situations where the strain gage can only tolerate small strains but where the loads on ring cause 130 large ring strains.

The relationships apply even when the ring 154 is contained in an outer ring 130 as shown in FIG. 3. If two strain sensors 124 and 126 are used, additional geometry may be provided to make the two strain signals equal or to make one strain sensor a fixed reference.

The perpendicular (arrow 128 direction) strain in the angled crossbeam arms is the signal strain in the strain sensors, and a tension load applied to those arms by the ring to which they are attached will cause a strain sensor such as 126 located on the right-hand side of the crossbeam 162 tend to go into tension (or reduce compression if preloaded) as the angled arms straighten and the angles decrease while a strain sensor such as 124 on the opposite side of the crossbeam will tend to go into compression.

As discussed above, angle E) of the crossbeam arms is defined by: (a) the two lines 222 and 224 which extend to the transverse centerline 178 of crossbeam hub 168; and (b) a line 228 parallel to longitudinal transducer axis 156. An angle close to 180 degrees will generally be selected if a high perpendicular strain is desired, which is the case if the strain sensor can withstand and respond to a high strain and a large signal is desired. The angle can range down to much less than 90 degrees if a low strain signal is satisfactory.

The selection of a particular angle will depend on the material from which transducer frame 22 is fabricated, the particular strain sensor being used, the amount of preload, the compliance of the preload member such as crossbeam 162, the stiffness of the ring spanned by and connected to the crossbeam, the crossbeam span, and other factors. The angle is best chosen by using finite element analysis taking into account the particular characteristics of the selected strain sensor and the other factors just discussed.

Figure 4:
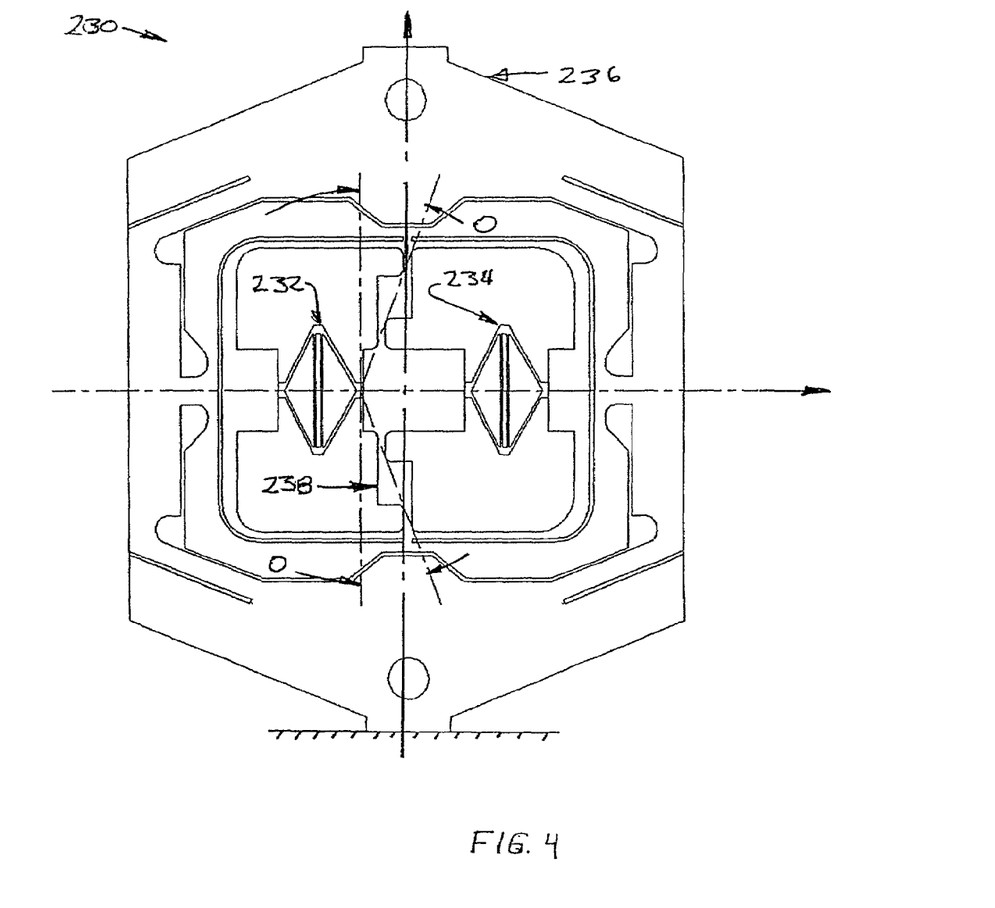
FIG. 4 is a plan view of a dual crystal in-line force transducer which embodies an angled crossarm and two active crystals.

A transducer 230 resembling the transducer 120 shown in FIG. 3 and described above is illustrated in FIG. 4 and identified by reference character 230. Transducer 200 differs from transducer 120 in that both of its load sensors 232 and 234 are active; i.e., so mounted in the frame 236 of the transducer that they will output signals proportional to a load in the crossarm 238 direction (arrow 240). Specifically, the two crystal type strain gages 202 and 204 have substantially equal signal magnitudes of opposite sign allowing the use of the difference between them as a measure of load. This arrangement is much less dependent on temperature and time effects since using the difference as the signal removes common mode effects such as differential thermal expansion, metal part material instabilities, etc.

Figure 5:
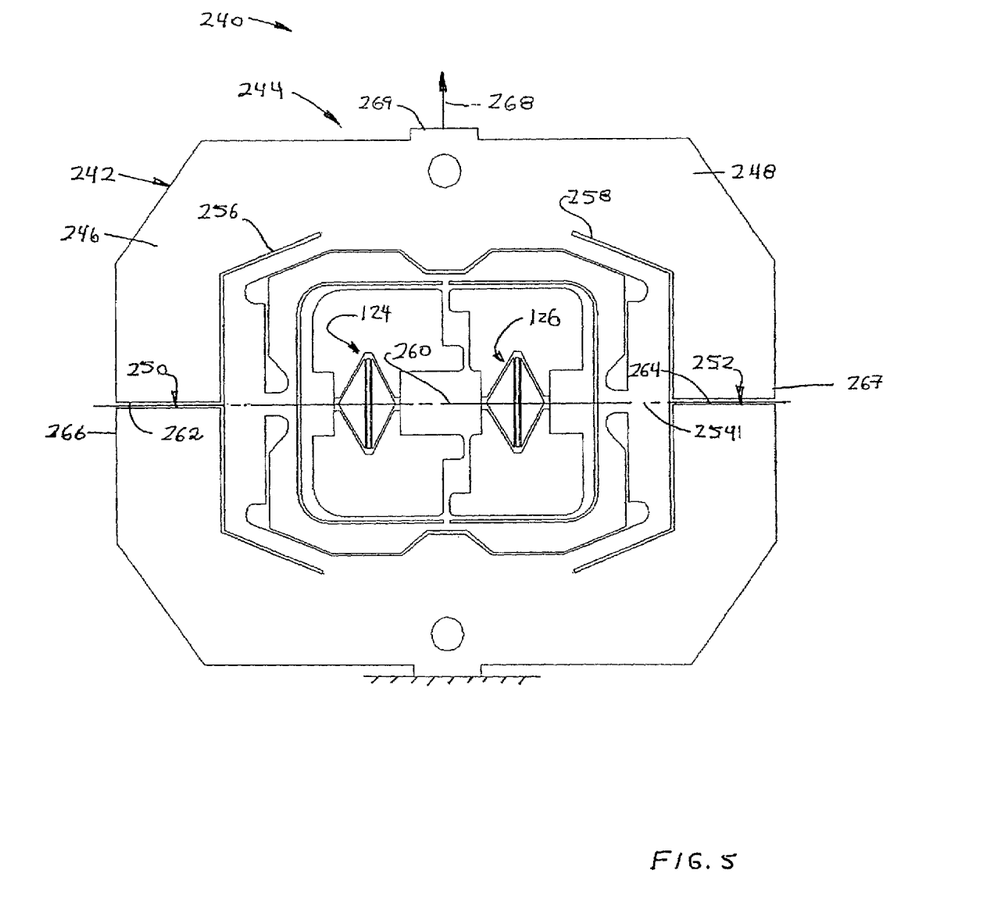
FIG. 5 is a plan view of a third dual crystal transducer which embodies the principles of the invention and has a caging capability which keeps high compressive loads from overstressing the sensing elements of the transducer.

FIG. 5 depicts a transducer 240 which embodies the principles of the present invention and differs from the transducer 120 illustrated in FIG. 3 and described above primarily in the configuration of the outer ring 242 of transducer frame 244. In transducer 240, the end pieces 246 and 248 of outer ring 242 have T-shaped slots 250 and 252, both symmetrically disposed about the longitudinal centerline 254 of transducer frame 244. Trapezoidal segments 256 and 258 of slots 250 and 252 are oriented at right angles to centerline 260, and the stems 262 and 264 of the slots extend along centerline 260 from trapezoidal slot segments 256 and 258, opening onto the edges 266 and 267 of the transducer frame outer ring 252.

The arrangement of slots 250 and 252 just described provides compression caging. As discussed above, caging keeps force sensing crystals 124 and 126 from being overloaded when a force acting in the direction of arrow 268 is applied to force transmitting pad 269 of transducer frame 224.

Figure 6:
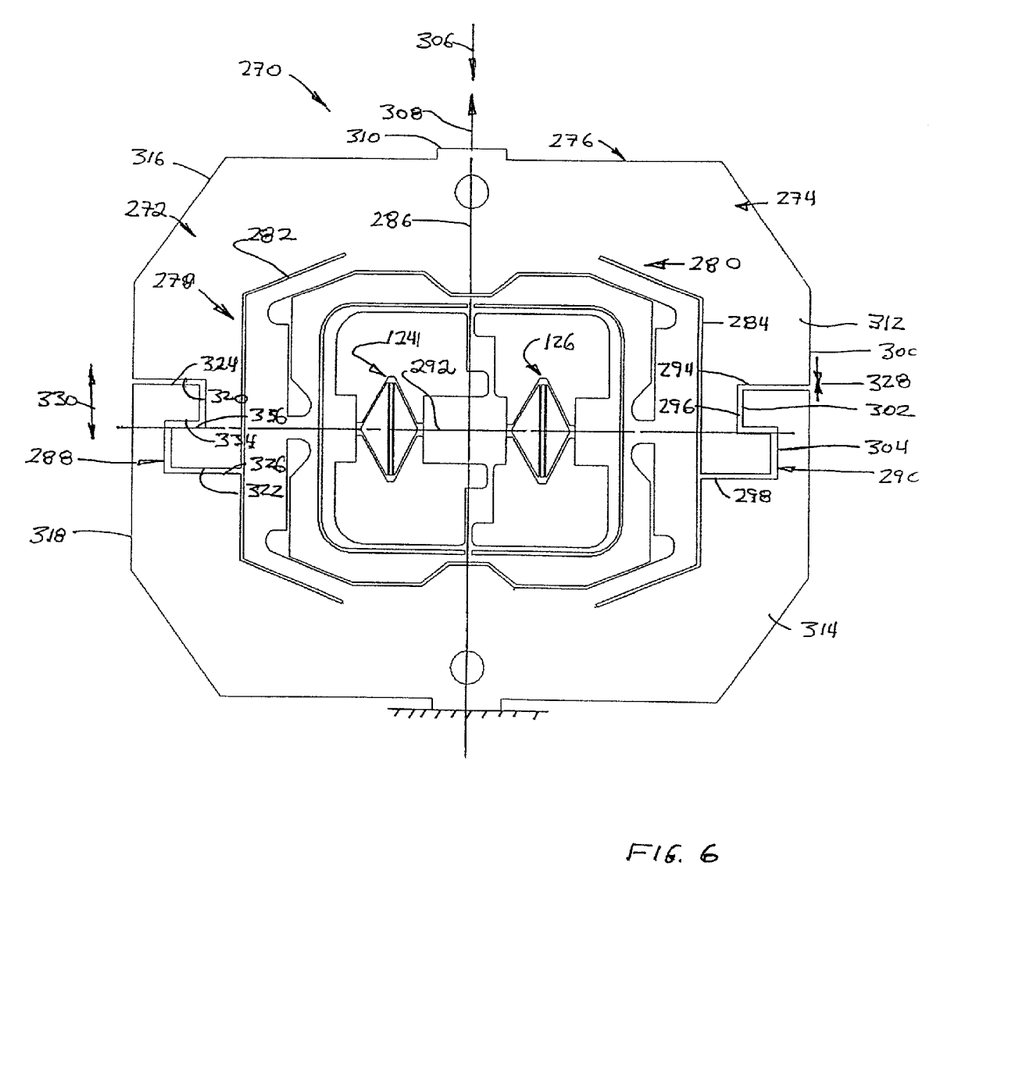
FIG. 6 is a plan view of yet another transducer which embodying the principles of the invention; this transducer has caging capabilities both when tension and compression loads are applied to the transducer.

The transducer 270 illustrated in FIG. 6 differs from just-described transducer 240 primarily in the configuration of the slots employed to provide caging and consequent strain limiting at force sensing crystals 124 and 126. In transducer 270, these caging slots are formed in the end pieces 272 and 274 of transducer frame outer ring 276 and identified by reference characters 278 and 280. Like the caging slots 250 and 252 of transducer 240, the caging slots 278 and 280 of transducer 270 have stems and trapezoidal segments with the latter being identified by reference characters 282 and 284 and being oriented at right angles to longitudinal transducer centerline 286.

The stems of caging slots 278 and 280, identified by reference characters 288 and 290, are identical though disposed in mirror image relationship relative to the transverse centerline 292 of transducer frame outer ring 276. In view of the foregoing and in the interest of brevity, only the stem 288 of caging slot 278 will be described in detail herein.

That stem has three longitudinally extending segments 294, 296, and 298. Segment 296 is centered on longitudinal centerline 286 of transducer frame outer ring 276, and slot segments 294 and 298 lie on opposite sides of and at equal, distances from centerline 286 with segment 294 opening onto the outer edge 300 of transducer frame outer ring 276 and segment 298 joining trapezoidal configured slot segment 282. The inner end of slot segment 294 is joined to the inner end of segment 296 by a transversely extending segment 302 of the slot, and the outer end of slot segment 298 is connected to the outer end of slot segment 296 by a second, also transversely extending segment 304.

With the caging slots 278 and 280 configured as shown in FIG. 6 and just described, transducer 270 has both tension and compressive caging capabilities; i.e., protection against overloading of the sensing devices both when compression forces acting in the direction of arrow 306 and tension forces acting in the direction of arrow 308 are applied to force transmitting pad 301 of transducer frame outer ring 244. The end pieces 272 and 274 of transducer frame outer ring 244 are relatively pliant when a compression load is applied to force, transmitting pad 310 because the segments 312 and 314 of end piece 272 and the segments 316 and 318 of end piece 274 can move relative to each other.

If the force is in a higher range, the segments 312/314 and 316/318 of end pieces 272 and 274 come into contact. The stiffness of end pieces 272 and 274 is thereby significantly increased and the ratio between the forces applied to force transmitting pad 310 and those forces applied to sensors 124 and 126 is corresponding and significantly increased.

Consequently, only a small force will be applied to the sensors when an external load of a large magnitude is applied to the transducer.

Also, in the case of transducer 270, the serpentine configuration of caging slot stems 288 and 290 results in the end piece segments 312/314 and 316/318 coming into contact under higher range loads to significantly reduce the unit forces applied to the sensing devices 124 and 126 irrespective of whether the force applied to transducer force transmitting pad 310 is acting in tension or in compression. In compression, the surfaces 320 and 322 of end piece segments 312 and 316 engage surfaces 324 and 326 of representative end piece segments 314 and 318 as the segments of end pieces 272 and 274 move toward each other (see arrow 328 in FIG. 6).

Under tension loads, the segments 312/314 and 316/318 of end pieces 272 and 274 move apart as suggested by arrow 330 in FIG. 6, and surface 334 of end piece segment 318 engages associated surfaces 336 of end piece segments 316 and 318 with the segments then acting as stiff solid pieces to reduce the forces transmitted to the sensing elements.

Figure 7:
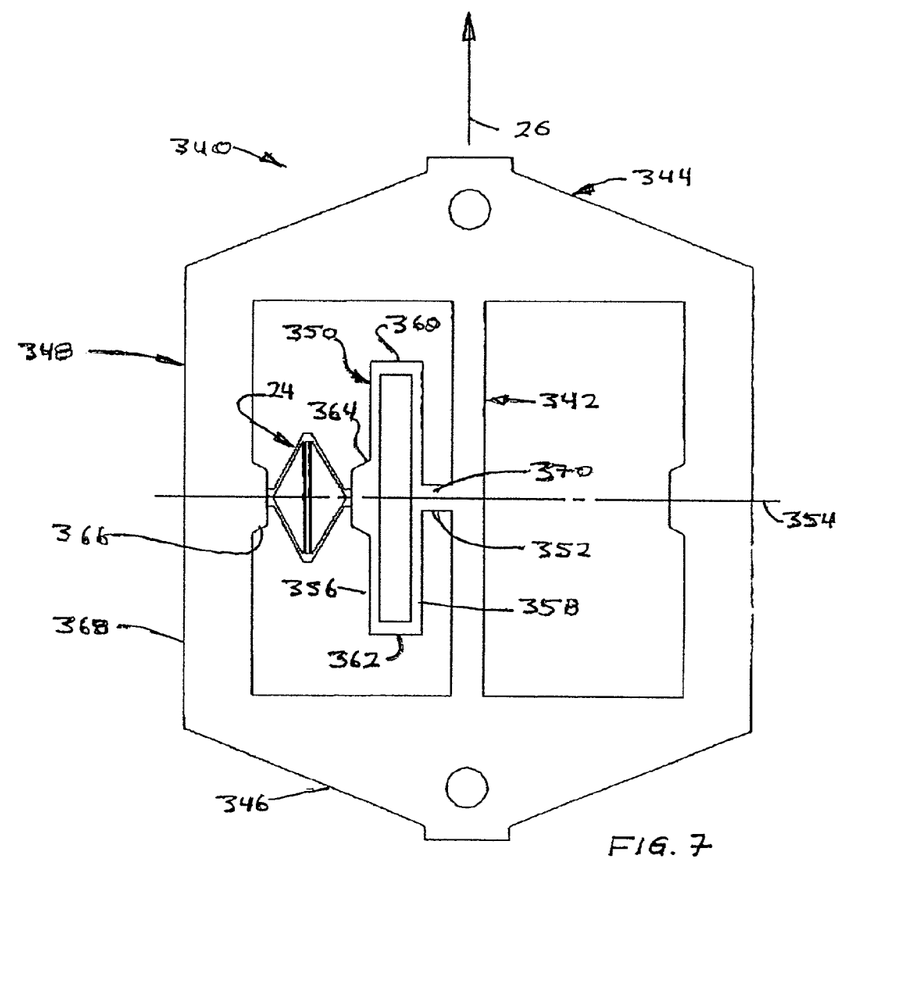
FIG. 7 is a plan view of still another transducer which embodies the principles of the present invention and has a folded back crossbeam.

FIG. 7 depicts a transducer 340 which is similar to the transducer 20 illustrated in FIG. 1 and identified above but differs in that the crossbeam 342 spanning the upper and lower end pieces 344 and 346 of transistor frame 348 carries an integral, folded back preload arm 350 which is mounted to crossbeam 342 by a stub 352 lying along the transverse centerline 354 of the transducer. Preload arm 350 extends longitudinally in the same direction as crossbeam 342 and has side segments 356 and 358 separated by integral, transversely extending end segments 360 and 362. Crystal 24 is mounted between an integral boss 364 on segment 356 of the preload arm and a complementary boss 366 on the side piece 368 of transducer frame 344.

The transducer frame and preload arm configuration just described provides increased compliance for a transducer frame of given size, which minimizes the overall dimensions of the transducer. The geometry shown in FIG. 7 is also important in that the area of attachment 370 of preload arm 350 to crossbeam 342 is small. As discussed above, this minimizes, if it does not substantially eliminate, the possibility that unwanted stress stiffening might occur as a load is placed on transducer 340. As was also discussed above, such stress stiffening is undesirable because it can lead to non-linearity of the signal generated by transducer 340.

In many cases the components of different ones of the transducers illustrated in the drawings and described above have common features or components. To the extent that is true, such components and features have for the most part been identified by the same reference characters.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A force sensing transducer which comprises:
    a load carrying frame having a force transmitting segment which moves as an external force is applied to said frame;
    a pliant crossbeam located in a hollow in the load carrying frame, said crossbeam lying in the same plane as said frame and being deflectable by the application of a force to the load carrying frame and the consequent movement of the force transmitting segment of the load carrying frame;
    a force sensing element mounted in said hollow between a second segment of said load carrying frame and said crossbeam and lying in the same plane as said frame and said crossbeam; and
    said crossbeam being so configured and so anchored at opposite ends thereof to opposed elements of said frame as to apply a compressive preloading force to, and along a sensing axis of, said sensing element.

2. A transducer as defined in claim 1 in which said sensing element is in direct contact with said crossbeam.

3. A transducer as defined in claim 1 in which said sensing element preloaded and trapped between said crossbeam and said load carrying frame.

4. A transducer as defined in claim 1 in which the crossbeam has at least one segment configured to increase the compliance of said crossbeam.

5. A transducer as defined in claim 1 in which the force transmitting segment and the crossbeam are so related as to preload the sensing element.

6. A force sensing transducer as defined in claim 1 wherein said frame is the outermost of plural nested frames and wherein there are slots in opposite sides of said frame, said slots being so located and configured as to keep excessive force from being applied to said force sensing element.

7. A transducer as defined in claim 2 in which said crossbeam has arms which are angled from the normal toward the force transmitting segment of the load carrying frame to alter the ratio of the force-associated strains in said frame and said sensing element.

8. A transducer as defined in claim 2 in which said load carrying frame and said crossbeam are integral components of said transducer.

9. A transducer as defined in claim 2 in which the load carrying frame has force transmitting components located on opposite sides of said crossbeam.

10. A transducer as defined in claim 8 which has a force sensing element mounted between said crossbeam and each of said force transmitting segments.

11. A force sensing device as defined in claim 9 in which one of said sensing elements is responsive to a force applied to the transducer and the other of said sensing elements supplies a reference force.

12. A force sensing device as defined in claim 9 in which a first and second of said sensing elements are respectively responsive to movement of first and second ones of said force transmitting segments to generate a signal indicative of the magnitude of a force applied to said transducer.

13. A transducer as defined in claim 2 which said load carrying frame has integral, hollow, inner and outer elements, wherein said sensing element is mounted in said inner element, and wherein the ends of the crossbeam are joined to said inner element on opposite sides of that element.

14. A force transducer as defined in claim 12 in which said inner element has segments which are compliant along the path of displacement of said force transmitting segments, and thereby allow the force transmitted by those segments to the sensing elements to be increased while keeping the stresses in said crossbeam within acceptable limits.

15. A transducer as defined in claim 2 which has an integral, hollow, intermediate element between said inner and outer elements.

16. A transducer as defined in claim 2 in which the load carrying frame is so constructed and configured as to keep excessive forces from being transmitted to the force sensing element.

17. A transducer as defined in claim 2 in which said sensing elements comprise at least one vibrating crystal.

18. A transducer as defined in claim 2 in which said load carrying frame has at least one jointed segment for increasing the compliance of said component.

19. A force sensing transducer which comprises:
a frame having a load carrying component force transmitting segment which moves as force is applied to said component;
a crossbeam mounted in a hollow in the load carrying component, said crossbeam being deflectable by the application of a force to said load carrying component; and
a preloaded force sensing element so mounted in the hollow of said load carrying component relative to said crossbeam that deflection of said crossbeam imposes a signal generating strain on said sensing element;
  said force sensing element being in surface-to-surface contact with a preloading element;
  the sensing element and the preloading element lying in the same plane; and
  the contacted surface diameter of the preloading element and the span across the sensing element being substantially equal and thereby reducing errors attributable to out-of-plane relative rotation between the sensing element and the preloading element.

20. A transducer as defined in claim 19 in which said force sensing element is preloaded and retained in a hollow of said frame by said crossbeam.

* * * * *